(12) United States Patent
Henderson et al.

(10) Patent No.: US 7,008,769 B2
(45) Date of Patent: *Mar. 7, 2006

(54) NANOSCALE MOLECULAR ARRAYER (75) Inventors: Eric Henderson, Ames, IA (US); Curtis Mosher, Ames, IA (US)

(73) Assignee: BioForce Nanosciences, Inc., Ames, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/929,865

(22) Filed: Aug. 14, 2001

(65) Prior Publication Data
US 2002/0076927 A1    Jun. 20, 2002

Related U.S. Application Data (60) Provisional application No. 60/225,434, filed on Aug. 15, 2000.

(51) Int. Cl.
C12Q 1/68      (2006.01)
C12M 1/36      (2006.01)
G01N 15/06     (2006.01)

(52) U.S. Cl. ............... 435/6; 435/7.1; 435/174; 435/283.1; 435/287.2; 422/68.1; 422/99; 422/100

(58) Field of Classification Search ........... 435/4, 435/6, 7.1, 174, 283.1, 287.2; 422/68.1, 422/99, 100
See application file for complete search history.

(56) References Cited

U.S. PATENT DOCUMENTS

| | | |
|---|---|---|
| 4,728,591 A | 3/1988 | Clark et al. |
| 5,106,729 A | 4/1992 | Lindsay et al. |
| 5,138,174 A | 8/1992 | Tang |
| 5,143,854 A | 9/1992 | Pirrung et al. |
| 5,150,392 A * | 9/1992 | Hohn et al. .............. 378/34 |
| 5,314,829 A | 5/1994 | Coles |
| 5,345,815 A | 9/1994 | Albrecht et al. |
| 5,346,683 A | 9/1994 | Green et al. |
| 5,363,697 A | 11/1994 | Nakagawa |
| 5,372,930 A | 12/1994 | Colton et al. |
| 5,384,261 A | 1/1995 | Winkler et al. |
| 5,440,122 A | 8/1995 | Yasutake |
| 5,443,791 A * | 8/1995 | Cathcart et al. ........... 422/65 |
| 5,445,934 A | 8/1995 | Fodor et al. |
| 5,445,971 A | 8/1995 | Rohr |

(Continued)

FOREIGN PATENT DOCUMENTS

JP   06124680   5/1994

(Continued)

OTHER PUBLICATIONS

Hong, S. et al. "A Nanoplotter with Both Parallel and Serial Writing Capabilities", Science vol. 288, No. 5472, Jun. 9, 2000 6pgs.

(Continued)

Primary Examiner—B J Forman
(74) Attorney, Agent, or Firm—Michael Best & Friedrich, LLP (57) ABSTRACT

The present invention is a dedicated apparatus for the formation of array that includes one or more deposition domains comprised of one or more deposition materials. The present invention may include an X, Y controller, an X, Y translation stage, a loading substrate, a deposition substrate, a Z controller, and a deposition probe. A computer controls all of the relative positions of each of the components. Furthermore, the present invention utilizes a humidity control system to create a capillary bridge between the probe and the substrate for transferring the deposition material between the loading substrate, the deposition probe, and the deposition substrate.

28 Claims, 4 Drawing Sheets

U.S. PATENT DOCUMENTS

| | | |
|---|---|---|
| 5,453,970 A | 9/1995 | Rust et al. |
| 5,467,642 A | 11/1995 | Hosaka et al. |
| 5,472,881 A | 12/1995 | Beebe et al. |
| 5,482,601 A | 1/1996 | Ohshima et al. |
| 5,514,540 A | 5/1996 | Teoule et al. |
| 5,514,550 A | 5/1996 | Findlay et al. |
| 5,519,212 A | 5/1996 | Elings et al. |
| 5,532,128 A | 7/1996 | Eggers et al. |
| 5,571,639 A | 11/1996 | Hubbell et al. |
| 5,601,982 A | 2/1997 | Sargent et al. |
| 5,604,097 A | 2/1997 | Brenner |
| 5,620,854 A | 4/1997 | Holzrichter et al. |
| 5,666,190 A | 9/1997 | Quate et al. |
| 5,670,322 A | 9/1997 | Eggers et al. |
| 5,688,486 A | 11/1997 | Watson et al. |
| 5,720,928 A | 2/1998 | Schwartz |
| 5,744,305 A | 4/1998 | Fodor et al. |
| 5,753,088 A | 5/1998 | Olk |
| 5,760,300 A | 6/1998 | Kajimura |
| 5,763,768 A | 6/1998 | Henderson et al. |
| 5,789,167 A | 8/1998 | Konrad |
| 5,800,992 A | 9/1998 | Fodor et al. |
| 5,837,832 A | 11/1998 | Chee et al. |
| 5,840,862 A | 11/1998 | Bensimon et al. |
| 5,846,724 A | 12/1998 | Bensimon et al. |
| 5,851,769 A | 12/1998 | Gray et al. |
| 5,866,328 A | 2/1999 | Bensimon et al. |
| 5,866,434 A | 2/1999 | Massey et al. |
| 5,874,219 A | 2/1999 | Rava et al. |
| 5,874,668 A | 2/1999 | Xu et al. |
| 5,948,972 A | 9/1999 | Samsavar et al. |
| 5,958,701 A | 9/1999 | Green et al. |
| 5,963,367 A * | 10/1999 | Aksyuk et al. ............. 359/392 |
| 5,965,133 A | 10/1999 | Cantor et al. |
| 5,981,733 A | 11/1999 | Gamble et al. |
| 5,985,356 A | 11/1999 | Schultz et al. |
| 5,992,226 A | 11/1999 | Green et al. |
| 5,993,627 A * | 11/1999 | Anderson et al. ........... 204/456 |
| 6,004,617 A | 12/1999 | Schultz et al. |
| 6,024,925 A * | 2/2000 | Little et al. ................. 422/100 |
| 6,033,911 A | 3/2000 | Schultz et al. |
| 6,045,671 A | 4/2000 | Wu et al. |
| 6,080,586 A | 6/2000 | Baldeschwieler et al. |
| 6,083,763 A | 7/2000 | Balch |
| 6,085,581 A | 7/2000 | Jones et al. |
| 6,087,274 A * | 7/2000 | Tonucci et al. ............. 438/758 |
| 6,097,473 A | 8/2000 | Ota et al. |
| 6,103,518 A | 8/2000 | Leighton |
| 6,110,426 A | 8/2000 | Shalon et al. |
| 6,123,819 A | 9/2000 | Peeters |
| 6,143,574 A | 11/2000 | Karlsson et al. |
| 6,146,899 A | 11/2000 | Porter et al. |
| 6,159,742 A | 12/2000 | Lieber et al. |
| 6,171,797 B1 | 1/2001 | Perbost |
| 6,180,114 B1 | 1/2001 | Yager |
| 6,200,737 B1 | 3/2001 | Walt et al. |
| 6,203,814 B1 | 3/2001 | Fisher et al. |
| 6,214,552 B1 | 4/2001 | Heroux et al. |
| 6,218,122 B1 | 4/2001 | Friend et al. |
| 6,231,744 B1 | 5/2001 | Ying et al. |
| 6,232,706 B1 | 5/2001 | Dai et al. |
| 6,239,273 B1 | 5/2001 | Pease et al. |
| 6,255,469 B1 | 7/2001 | Seeman et al. |
| 6,270,946 B1 | 8/2001 | Miller |
| 6,278,231 B1 | 8/2001 | Iwasaki et al. |
| 6,284,497 B1 | 9/2001 | Sabanayagam et al. |
| 6,287,850 B1 | 9/2001 | Besemer et al. |
| 6,289,717 B1 | 9/2001 | Thundat et al. |
| 6,309,831 B1 | 10/2001 | Goldberg et al. |
| 6,329,209 B1 | 12/2001 | Wagner et al. |
| 6,331,396 B1 | 12/2001 | Silverman |
| 6,350,609 B1 * | 2/2002 | Morozov et al. ......... 435/283.1 |
| 6,383,801 B1 | 5/2002 | Leighton |
| 6,395,554 B1 * | 5/2002 | Regan et al. .................. 436/46 |
| 6,406,921 B1 | 6/2002 | Wagner et al. |
| 6,416,952 B1 | 7/2002 | Pirrung et al. |
| 6,420,105 B1 | 7/2002 | Landfield et al. |
| 6,436,647 B1 | 8/2002 | Quate et al. |
| 6,509,969 B1 | 1/2003 | Takeshita et al. |
| 6,518,168 B1 | 2/2003 | Clem et al. |
| 6,559,457 B1 | 5/2003 | Phan et al. |
| 6,573,369 B1 | 6/2003 | Henderson |
| 6,582,967 B1 | 6/2003 | Muraca |
| 6,635,311 B1 * | 10/2003 | Mirkin et al. ................ 427/256 |
| 6,755,834 B1 | 6/2004 | Amis |
| 2002/0042081 A1 | 4/2002 | Henderson et al. |
| 2002/0063212 A1 * | 5/2002 | Mirkin et al. ................ 250/306 |
| 2002/0076927 A1 | 6/2002 | Henderson et al. |
| 2002/0083998 A1 * | 7/2002 | Overbeck et al. ........... 141/279 |
| 2002/0106626 A1 | 8/2002 | Muraca |
| 2002/0114987 A1 | 8/2002 | Oscarsson et al. |
| 2002/0117611 A1 | 8/2002 | Kley |
| 2002/0122873 A1 | 9/2002 | Mirkin et al. |
| 2002/0123135 A1 | 9/2002 | Henderson et al. |
| 2002/0146714 A1 | 10/2002 | Lieber et al. |
| 2002/0146813 A1 | 10/2002 | Leighton |
| 2002/0172943 A1 | 11/2002 | Henderson et al. |
| 2002/0179434 A1 | 12/2002 | Dai et al. |
| 2002/0190178 A1 | 12/2002 | Gorfain |
| 2003/0013111 A1 | 1/2003 | Henderson et al. |
| 2003/0039384 A1 | 2/2003 | Bacus et al. |
| 2003/0048933 A1 | 3/2003 | Brown et al. |
| 2003/0057379 A1 | 3/2003 | Montagu |
| 2003/0089163 A1 | 5/2003 | McWaid et al. |
| 2003/0127609 A1 | 7/2003 | El-Hage et al. |
| 2003/0148538 A1 | 8/2003 | Ng |
| 2004/0118193 A1 | 6/2004 | McWaid et al. |

FOREIGN PATENT DOCUMENTS

| | | |
|---|---|---|
| JP | 07027771 | 1/1995 |
| JP | 08094646 | 4/1996 |
| WO | WO 92/15709 | 9/1992 |
| WO | WO 96/31775 | 10/1996 |
| WO | WO 97/06420 | 2/1997 |
| WO | WO 97/18326 | 5/1997 |
| WO | WO 98/05920 | 2/1998 |
| WO | WO 98/18959 | 5/1998 |
| WO | WO 99/31267 | 6/1999 |
| WO | WO 99/44063 * | 9/1999 |
| WO | WO 00/04382 | 1/2000 |
| WO | WO 00/04389 | 1/2000 |
| WO | WO 00/04390 | 1/2000 |
| WO | WO 00/36136 | 6/2000 |
| WO | WO 00/41213 | 7/2000 |
| WO | WO 00/46406 | 8/2000 |
| WO | WO 01/60316 | 8/2001 |
| WO | WO 01/918555 | 12/2001 |
| WO | WO 03/001633 | 1/2003 |
| WO | WO 03/036767 | 5/2003 |
| WO | WO 03/038033 | 5/2003 |
| WO | WO 03/048314 | 6/2003 |
| WO | WO 03/052514 | 6/2003 |

OTHER PUBLICATIONS

Hong, Z. et al. "Multiple Ink Nanclithography", Toward a Multiple-Pen Nano-Plotter, *Science* vol. 286, No. 5439, Oct. 15, 1999 5pgs.

Piner, R.D., et al. "Dip-Pen Nanolithography", *Science* vol. 283, No. 5402, Jan. 29, 1999 5pgs.

"Microbeam Mass Spectrometry" *Chemical Science and Technology Laboratory, Surface and Microanalysis Science Division* http://www.cstl.nist.gov/div837/Divisoin/expertise/ions/masspec1.htm Jul. 18, 2002.

Abstracts of Papers Part I, 214th "Abstract 027" *ACS National Meeting American Chemical Society*, Sep. 1997, 2 pgs.

Allison, D., et al., "Direct atomic force microscopy imaging of *Eco*RI endonuclease site specifically bound to plasmid DNA molecues" *PNAS USA*, 1996, 93:8826-8829.

Allison, D., et al., "Mapping Individual Cosmid DNAs by Direct AFM Imaging" *Genomics*, 1997, 41:379-384.

Alves, et al., Atomic scale imaging of alkanethiolate monolayers at gold surfaces with atomic force microscopy: *J. Am. Chem. Soc.*, Feb. 1992,114(4):1222-1227.

Amro, et al., "Patterning surfaces using tip-directed displacement and self-assembly" *Langmuir*, 2000, 16:3006-3009.

Anwander, et al., "Surface characterization and functionalization of MCM-41 silicas via silazane silylation" *J. Phys. Chem. B.*, 2000, 104:3532-3544.

Arntz, et al., "Label-free protein assay based on a nanomechanical cantilever array" *Nanotechnology*, 14 (2003) 86-90.

Ausubel, F.M., et al. "Current Protocols in Molecular Biology" 1993 ed. vol. 1&2, 1993, Green Publishing Associated and Wiley-Interscience, Table of Contents.

Avouris, P, et al., "Engineering Carbon Nanotubes and Nanotube Circuits Using Electrical Breakdown" *Science*, Apr. 2001, 292(5517):706-799.

Bailey, C.P., et al., Cationic oligonucleotides can mediate specific inhibition of gene expression in Xenopus oocytes *Nuc. Acids Res.*, 1998, 26(21):4860-4867.

Bain, et al., "Modeling organic surfaces with self-assembled monolayers" *Agnew. Chem. Int. Ed. Engl.*, 1989, 28(4):506-512.

Baselt, D.R. et al., "A biosensor based on magnetoresistance technology" *Biosens. Bioelectorn*, 1998, 13(7-8):731-739.

Bedouelle, H., "Reagentless fluorescent Immunosensors" *Antibody Engineering*, IBC's 13th International Conference, Dec. 2, 2002.

Belaubre, P. et al., "Fabrication of biological microarrays using microcantilevers" *Applied Physics Letters*,. May 2003, 82(18):3122-3124.

Bensimon, A., et al., "Alignment and sensitive detection of DNA by a moving interface" *Science*, 1994, Sep 30; 265 (5181):2096-2098 [PMID 7522347] Abstract.

Berggren, et al., "Microlithography by using neutral metastable atoms and self-assembled monolayers" *Science*, Sep. 1995, 269(5228):1255-1257.

Bernard, et al. "Printing patterns of proteins" *Langmuir The ACS Journal of Surfaces and Colliod*, Apr. 1998, 14(9): 2225-2229.

Binggeli, et al., "Influence of capillary condensation of water on nanotribology studied by force microscopy" *Appl. Phys. Lett.*, Jul. 1994, 65(4):415-417.

Binning, et al., "Surface studies by scanning tunneling microscopy" *Phys. Rev. Lett.*, 1982, 49(1):57-61.

Binning, G., et al., Atomic force microscope *Phys. Rev. Lett.*, 1986, 56(9):930-933.

Bishop, et al., "Self-assembled monolayers: recent developments and applications" *Colloid & Interface Science*, Feb. 1996, 1:127-136.

Bottomley, L., "Scanning probe microscopy" *Anal. Chem.*, Jun. 1998, 70(12):425R-475R.

Brandow, S., et al., "Metal pattern fabrication using the local electric field of conducting atomic force microscope probe" *J. Vac. Sci. Technol.*, May/Jun. 1997, 15(3):1455-1459.

Brenner, S., et al., "Gene expression analysis by massively parallel signature sequencing (MPSS) on microbead arrays" *Nat. Biotechnol 2000*, Jun. 18(6):630-634, 2000.

Brody, E., and Gold, L., "Aptamers as therapeutic and diagnostic agents" *Molecular Biotechnology*, 2000, 74:5-13.

Bruckbauer, et al., "Writing with DNA and Protein Using a Nanopipet for Controlled Delivery" *JACS*, 2002, A-B.

Bulyk, et al., "Quantifying DNA-protein interactions by double-stranded DNA arrays" *Nature Biotechnology*, Jun. 1999, 17:573-577.

Bustamante C., et al., "Circular DNA Molecules Imaged in Air by Scanning Force Microscopy" *Biochemistry*, 1992, 31:22-26.

Bustamante, C., et al., "Biochemical and structural applications of scanning force microscopy" *Curr. Opin. Struct. Biol.*, 1994 4(5):750-760.

Carr, et al., "High-selectivity pattern transfer process for self-assembled monolayer electron beam resists" *J. Vac. Sci. Technol.*, May/Jun. 1997, 15(3):1446-1450.

Cheng, et al., "Preparation and hybridization analysis of DNA/RNA from *E. coli* on microfabricated bioelectronic chips" *Nature Biotechnology*, 1998, 16:541-546.

Chrisey et al, "Fabrication of patterned DNA surfaces" *Nucleic Acids Research*, (Oct. 1996)24(15):3040-3047.

Clark, M.W. et al., "Nanotechnology tools for functional proteomics analysis" *American Biotechnology Laboratory*, Mar. 2001, 16-18.

Colas, et al., "Genetic selection of peptide aptamers that recognize an inhibit cyclin-dependent kinase 2", *Nature*, Apr. 1996 380(11):548-550.

Colvin, et al. "Semiconductor nanocrystals covalently bound to metal surfaces with self-assembled monolayers" *J. Am. Chem. Soc.*, 1992, 114:5221-5230.

Cui, Y, et al., "Nanowire nanosensors for highly sensitive and selective detection of biological and chemical species" *Science*, 2001, 293, 1289-1292.

Dai, et al., "Nanotube Molecular Wires as Chemical Sensors" *Science*, Jan. 28, 2000, 287:622-625.

Dai, H, et al., "Controlled chemical routes to nanotube architectures" Physics and Devices, *J. Phys. Chem B*, 1999, 103:11246-11255.

Dai, H, et al., "Probing electrical transport in nanomaterials: conductivity of individual carbon nanotubes" *Science*, 1996, 272(5261):523-526.

Dammer, et al., "Binding strength between cell adhesion proteoglycans measured by atomic force microscopy" *Science*, 1995, 267:1173-1175.

Dammer, et al., "Specific antigen/antibody interactions measured by force microscopy" *Biophys. J.*, 1996, 70:2437-2441.

Delamarch, E., et al., "Patterned delivery of immunoglobulins to surfaces using microfluidic networks" *Science*, 1997, 276:779-781.

Ding, Y., Oka, T., et al., "Near-field stimulated TOF nanometric surface mass spectroscopy: characterization of Nano-localized surfaces" Joint International Meeting—200th Meeting of the Electrochemical Society, Inc., 52nd Annual Meeting of the International Society of Electrochemistry, San Francisco, California (2001).

Ding, Y., Ruggero, M. et al., "Development of UHV-STM/TOF hybrid mass analyzer system for nano-characterization of metal silicide surfaces" 198th Meeting of the Electrochemical Society, Phoenix, Arizona (2000).

DeRisi, et al., "Exploring the Metabolic and Genetic Control of Gene Expression on a Genomic Scale" *Science*, Oct. 1997, 278:680-686.

Dong, Y. and Shannon, C., "Heterogeneous Immunosensing Using Antigen and Antibody Monolayers on Gold Surfaces with Electrochemical and Scanning Probe Detection" *Anal. Chem.*, 2000, 72:2371-2376.

Dontha, N., et al., "Development of sub-micron patterned carbon electrodes for immunoassays" *J. Pharm. Biomed. Analysis*, (Feb. 1999) 19:83-91.

Dontha, N., et al., "Generation of Biotin/Avidin/Enzyme Nanostructures with Maskless Photoligography" *Anal. Chem*, 1997, 69: 619-2625.

Dubois, L. et al., "Synthesis, Structure, and Properties of Model Organic Surfaces" *Annu. Rev. Phys. Chem.*, 1992, 43:437-463.

Durbin, S., Feher, G., "Protein crystallization" *Annual Review of Phys Chemistry*, 1996, 47:171-204.

Falvo, M.R., et al., "Bending and buckling of carbon nanotubes under large strain" *Nature*, 1997, 389:582-584.

Fan, S., et al., "Self-oriented regular arrays of carbon nanotubes and their functional devices" *Science*, 1999, 283, 512.

Fang, et al., "Membrane Protein Microarrays" *JACS*, 2002, 124(11):2394-2395.

Farajian, A.A., et al., "Nonlinear Coherent Transport Through Doped Nanotube Junctions" *Physical Review*, Jun. 21, 1999, 82(25):5084-5087.

Feigon, J. "DNA triplexes, quadruplexe, and aptamers" *Clin. Chem.*, 1994, 40(4):647-647.

Florin, E., et al., "Adhesion forces between individual ligan-receptor pairs" *Science*, 1994, 264:415-417.

Fodor, S., et al., "Light-directed spatially addressable parallel chemical synthesis" *Science* 1991, 251: 767-773.

Fodor, S., et al., "Multiplexed biochemical assays with biological chips" *Nature*, 1993, 364:555-557.

Frisbie, C.D., et al., "Functional group imaging by chemical force microscopy" *Science*, 1994, 265:2071-2074.

Fritz, J., et al., "Translating biomolecular recognition into nanomechanics" *Science*, 2000, 316-318.

Fritzsche, W., et al., "Application of Atomic Force Microscopy to Visualization of DNA, Chromatin and Chromosomes" *Critical Reviews™ in Eukaryotic Gene Expression*, 1997, 7(3):231-240.

Fritzsche, W., et al., "Chicken Erythrocyte Nucleosomes Have a Defined Orientation along the Linker DNA-A Scanning Force Microscopy Study" *Scanning*, 1997, 19:42-47.

Fritzsche, W., et al., "Mapping elasticity of rehydration metaphase chromosomes by scanning force microscopy" *Ultramicroscopy*, 1997, 69:191-200.

Fritzsche, W., et al., "Ribosomes substructure investigated by scanning force microscopy and image processing" *Journal of Microscopy*, 1998, 189, Pt 1, 50-56.

Fujihira, et al., "Effect of capillary force on friction force microscopy: a scanning hydrophilicity microscope" *Chemistry Letters*, Jul. 1996, 7:499-500.

Gillen, G. Bennett, J., et al., "Molecular imaging secondary ion mass spectrometry for the characterization of patterned self-assembled monolayers on silver and gold" *Anal. Chemistry*, 1994, 66:2170-2174.

Girault, S., Chassaing, G. et al, "Coupling of MALDI-TOF mass analysis to the separation of biotinylated peptides by magnetic streptavidin beads" *Anal. Chemistry* 1996, 68: 2122-2126.

Grabar, et al., "Preparation and characterization of Au colloid monolayers" *Anal. Chem.*, 1995, 67(4):735-743.

Haab, et al., "Protein microarrays for highly parallel detection and quantitation of specific proteins and antibodies in complex solutions" *Genome Biology*, 2001, 2(2)0004.1-0004.13.

Hansma, H.G., et al., "Atomic force microscopy of long and short double-stranded, single-stranded and triple-stranded nucleic acids" *Nuc. Acids Res.*, 1996, 24(4):713-720.

Hansma, H.G. et al., "Recent advances in atomic force microscopy of DNA" *Scanning* 1993, 15(5):296-9.

Hansma, H.G., Sinsheimer, R.L., et al., "Atomic force microscopy of single-and double-stranded DNA" *Nucleic Acids Research* 1992, 20:3585-90.

Hansma, P.K., et al., "Tapping mode atomic force microscopy in liquids" *Appl. Phys. Lett.*, 1994, 64(13):1738-1740.

Heller, et al., "Discovery and analysis of inflammatory disease-related genes using cDNA microarrays" *PNAS USA*, 1997, 94: 2150-2155.

Henderson, E., "Atomic force microscopy of conventional and unconventional nucleic acid structures" *Journal of Microscopy*, 1992, 77-84.

Henderson, E., "Imaging and nanodissection of individual supercoiled plasmids by atomic force microscopy" *Nuc. Acids Res.*, 1992, 20(3):445-447.

Henderson, E., "Imaging of Living Cells by Atomic Force Microscopy" *Progress in Surface Science*, May 1994, 46 (1):39-60.

Henderson, E., "Molecular force detection and spectroscopy with the atomic force microscope" *Science Progress*, 1998, 81(2):141-151.

Henderson, E., et al., "Actin Filament Dynamics in Living Glial Cells Imaged by Atomic Force Microscopy" *Science*, 1992, 257:1944-1946.

Henderson, E., et al., "New Ribosome Structure" *Science*, 1984, 255:510-512.

Henderson, E., et al., "Telomeric DNA oligonucleotides form novel intramolecular structures containing guanine-guanine base pairs" *Cell*, 1987, 51(6):899-908.

Henderson, et al., "A method for gold coating experimental detector beampipes" htttb://www.lns.cornell.edu/public/CBN/1999/CBN99-7/cbn99-7.pdf, 1999.

Hiller, et al., "Microarrayed allergen molecules: diagnostic gatekeepers for allergy treatment" *FASEB*, 2002, 16:414-416.

Hinterdorfer, P. et al., "Detection and localization of individual antibody-antigen recognition events by atomic force microscopy" *PNAS*, 1996, 93:3477-3481.

Hoh, J.H. and Hansma, P.K., "Atomic force microscopy for high resolution imaging in cell biology" *Trends in Cell Biology*, 1992, 2:208-213.

Hoh, J.H., et al., "Atomic force microscopy and dissection of gap junctions" *Science*, 1991, 1405-1408.

Hoh, J.H., et al., "Quantized adhesion detected with the atomic force microscope" *J. Am. Chem. Soc.*, 1992, 114: 4917-4918.

Hong, et al., "A new tool for studying the in situ growth processes for self-assembled monolayers under ambient conditions" *Langmuir*, 1999, 15:7879-7900.

Hong, et al., "Multiple ink nanolithography: toward a multiple-pen nano-plotter" *Science*, 1999, 286:523-525.

Hong, S. et al. "A Nanoplotter with Both Parallel and Serial Writing Capabilities" *Science*, Jun. 9, 2000, 288:1808-1811.

Hovis, et al., "Cyloaddition chemistry and formation of ordered organic monolayers on silicone (001) surfaces" *Surface Science*, 1998, 402-404, pp. 1-7.

Hovis, et al., "Structure and bonding of ordered organic monolayers of 1,5-cyclooctadiene on the silicon (001) Surface" *J. Phys. Chem. B.*, 1997, 101:9581-9585.

Hu, et al., "Imaging the condensation and evaporation of molecularly thin films of water with nanometer resolution" *Science*, 1995, 268(5208):267-269.

Huck, et al., "Patterned polymer multilayers as etch resists" *Langmuir*, 1999, 15:6862-6867.

Ivanisevic, et al., "Dip-Pen Nanolithography on Semiconductor Surfaces" *J. Am. Chem. Soc.*, 2001, 123: 7887-7889.

Iyer, et al., "The Transcription Program in the Response of Human Fibroblasts to Serum" *Science*, 1999, 283(5398):83-87.

Jackman, et al., "Fabrication of submicrometer features on curved substrates by microcontact printing" *Science*, 1995, 269: 664-666.

James, et al., "Patterned protein layers on solid substrates by thin stamp microcontact printing" *Langmuir*, 1998, 14:741-744.

Janes, et al., "Electronic conduction through 2D arrays of nanometer diameter metal clusters" *Superlattices and Microstructures*, 1995, 18(4):275-282.

Jaschke, et al., "Deposition of organic material by the tip of a scanning force microscope" *Langmuir*, 1995, 11:1061-1064.

Jin, X., Unertl, W., "Submicrometer modification of polymer surfaces with a surface force microscope" *Applied Physics Letters*, 1992, 61(6): 657-659.

Jones, V., et al., "Microminiaturized Immunoassays Using Atomic Force Microscopy and Compositionally Patterned Antigen Arrays 66" *Anal. Chem.*, 1998, 70(7):1233-1241.

Karpovich, et al., "Direct measurement of the adsorption kinetics of alkanethioilate self-assembled monolayers on microcrystalline gold surface" *Langmuir*, 1994, 10:3315-3322.

Kim, et al., "Nanotube nanotweezers" *Science*, Dec. 10, 1999, 286:2148-2150.

Knezevic et al., "Proteomic profiling of the cancer microenvironment by antibody arrays" *Proteomics*, 2001,. 1:1271-1278.

Kochanek, et al., "Transcriptional silencing of human ALU sequences and inhibition of protein binding in the box B regulatory elements by 5'CG3 methylation" *FEBS Lett.*, 1995, 360(2):115-120 [PMID 7875314] Abstract.

Komeda, et al., "Octadecyltrichlorosilane self-assembled-monolayer islands as a self-patterned-mask for HF etching of $SiO_2$ on Si" *J. Vac. Sci. Technol A.*, 1998, 16(3):1680-1685.

Kumar, et al., "The use of self-assembled monolayers and a selective etch to generate patterned gold features" *J. Am. Chem. Soc.*, 1992, 114:9188-9189.

Lahiri, et al., "Patterning ligands on reactive SAMs by microcontact printing" *Langmuir*, 1999, 15:2055-2060.

Laibinis et al., "ω-terminated alkanethiolate monolayers on surfaces of copper, silver, and gold have similar wettabilities[1]" *J. Am. Chem. Soc.*, 1992, 114: 1990-1995.

Lal, R. and John, S.A., "Biological applications of atomic force microscopy" *Am J. Physiology*, 1994, 266(1):1-21.

Lanio, T., et al., "PCR-based random mutagenesis method using spiked oligonucleotides to ransomize (randomize?) selected parts of gene without any wild-type background" *Bioteechniques*, 1998, 25(6):958-965.

Lee, et al., "Nanometer-scale lithography on H-passivated Si(100) by atomic force microscope in air" *J. Vac. Sci. Technol. A.*, 1997, 15(3):1451-1454.

Lee, G. et al. "Direct measurement of the forces between complementary strands of DNA" *Science*, 1994, 266:771-773.

Lercel, et al. "Self-assembled monolayer electron-beam resists on GaAs and $SiO_2$" *J. Vac. Sci. Technol. B.*, 1993, 11(6): 2823-2828.

Lercel, et al., "Sub-10nm lithography with self-assembled monolayers" *Appl. Phys. Lett.*, 1996, 68(11):1504-1506.

Liu, et al., "Nanofabrication of self-assembled monolayers using scanning probe lithography" *Acc. Chem. Res.*, 2000, 33(7):457-466.

Lo, et al., "Organic and inorganic contamination on commercial AFM cantilevers" *Langmuir*, 1999, 15:6522-6526.

Lüthi, et al., Parallel nanodevice fabrication using a combination of shadow mask and scanning probe methods: *Applied Physics Letters*, 1999, 75(9):1314-1316.

Lutwyche, et al., "5x5 2D AFM cantilever arrays a first step toward Terabit storage device" *Sensors and Actuators*, 1999, 73:89-94.

Lynch, M., et al., "A Reliable Preparation Method for Imaging DNA by AFM" *Microscopy Today*, 1999, 99(9) 1 pg.

Lyubchenko, Y.L., "Atomic force microscopy of DNA and bacteriophage in air, water and propanol: The role of adhesion forces" *Nuc. Acids Res.*, 1993, 21(5):1117-1123.

Macaya, et al., "Thrombin-binding DNA aptamer forms a unimolecular quadruplex structure in solution" *PNAS USA*, Apr. 1993, 90:3745-3749.

MacBeath, G. and Schreiber, S.L., "Printing Proteins as Microarrays for High-Throughput Function Determination" *Science*, Sep. 8, 2000, 289:1760-1763.

Magno, R., Bennett, B., "Nanostructure patterns written in III-V semiconductors by an atomic force microscope" *Applied Physics Letters*, 1997, 70(14):1855-1857.

Malmborg, et al., "Real Time Analysis of Antibody-Antigen Reaction Kinetics", *Scand. J. Immunol.*, 1992, 35:634-650.

Marsh, T.C., et al., "A new DNA nanostructure imaged by scanning probe microscopy" *Nuc. Acids Res.* 1995, 23(4): 696-700.

Marsh, T.C., et al., "G-wires: Self-assembly of a telometic oligonucleotide, d(GGGGTTGGGG), into large superstructures" *Biochemistry* 1994, 33:10718-10724.

Martin, B., et al., "Ortogonal Self-Assembly on Colloidal Gold-Platinum Nanorods" *Advanced Materials*, 1999, 11: 1021.

Matteucci, et al., "Synthesis of deoxyoligonucleotides on a polymer support 1" *J. Am. Chem. Soc.*, 1981, 103:3185-3191.

Maynor, et al., "Au :Ink" for AFM "Dip-Pen" Nanolithography *Langmuir*, 2001, 17:2575-2579.

Mazzola, L., "Discrimination of DNA hybridization using chemical force microscopy" *Biophysical Journal*, 1999, 76:2922-2933.

Mazzola, L., "Imaging biomolecule arrays by atomic force microscopy" *Biophysical Journal*, 1995, 68:1653-1660.

McEuen, et al., "Crossed Nanotube Junctions" *Science*, Apr. 21, 2000, 288:494-497.

Meister, et al., "Nanoscale Dispensing of Liquids through Cantilevered Probes" *MNE '02*, Lugano, Switzerland, Sep. 16-19, 2002.

Mendoza, et al., "High-Throughput Microarray-Based Enzyme-Linked Immunosorbent Assay (ELISA)" *BioTechniques*, 1994, 27(4):778-788.

Meyer, G. and N.M. Amer, "Novel optical approach to atomic force microscopy" *Appl. Phys. Lett.*, 1988, 53:1045-1047.

Minne, et al., "Centimeter scale atomic force microscope imaging and lithography" *Applied Physics Letters*, 1998, 73(12):1742-1744.

Minne, S.C., et al., "Automated parallel high-speed atomic force microscopy" *Appl. Phys. Lett.*, 1998, 72(18):2340-2342.

Mirkin, et al., "Dip-Pen Nanolithography: Controlling Surface Architecture on the Sub-100 Nanometer Length Scale" *Chemphyschem*, 2001, 2:37-39.

Mirkin, et al., "Programming the Assembly of Two- and Three-Dimensional Architectures with DNA and Nanoscale Inorganic Building Blocks" Invited Contribution from Recipient of ACS Award in Pure Chemistry *Inorg. Chem.*, 2000, 39:2258-2272.

Mosher, C., et al., "NanoArrays, The Next Generation Molecular Array Format for High Throughput Proteomics, Diagnostics and Drug Recovery" *JALA*, 2000, 5(5):75-83.

Moy, et al., "Intermolecular Forces and Energies Between Ligands and Receptors" *Science*, 1994, 266:257-259.

Moy, V.T., et al., "Probing the forces between complimentary strands of DNA with the atomic force microscope" *SPIE*, 1995, 2384:2-12.

Mueller, et al., "Atomic force microscopy deposition of poly-1-lysine structures onto lipid bilayers supported by mica" *Langmuir*, 2000, 16:9568-9570.

Müller, et al., "Nanostructuring of alkanethiols with ultrastrap field emitters" *J. Vac. Sci. Technol. B.*, 1995, 13(6):2846-2849.

Murray, et al., "Atomic force microscopy of biochemically tagged DNA" *Proc., Natl., Acad. Sci.*, 1993, 90:3811-3814.

Musil, C., Nanostructuring of gold electrodes for immunosensing applications: *J. Vac. Sci. Technol. B.*, 1995, 13(6):2781-2786.

Niu, et al., "Atomic force microscoopy of DNA-colloidal gold and DNA-protein complexes" *SPIE Advances in DNA Sequencing Technology*, 1993, 1891:71-77.

Noy, et al., "Chemical force microscopy: exploiting chemically-modified tips to quantify adhesion, friction, and functional group distributions in molecular assemblies" *J. Am. Chem.*, 1995, 117:7943-7951.

Noy, et al., "Chemically-sensitive imaging in tapping mode by chemical force microscopy: relationship between phase lag adhesion" *Langmuir*, 1998, 14:1508-1511.

Nuzzo, R., "Spontaneously organized molecular assemblies. 3. Preparation and properties of solution adsorbed monolayers of organic disulfides on gold surfaces" *J. Am. Chem. Soc.*, 1987, 109:2358-2368.

Nyffenegger, et al., "Nonometer scale surface modification using the scanning probe microscope: progress since 1991" *Chem. Rev.*, 1997, 97:1195-1230.

O'Brien, J., et al., "Immunosensing Platforms Using Spontaneously Absorbed Antibody Fragments on Gold" *Analytical Chemistry*, 2000, 72(4)703-710 [PMID 10701253] Abstract.

Oshio, T. et al., "Atomic force microscopy detection system using an optical fiber heterodyne interferometer free from external disturbances" *Ultramicroscopy* 42-44 (Jul. 1992) 310-314.

Paweletz, et al., "Reverse phase protein microarrays which capture disease progression shoe activation of pro-survival pathways at the cancer invasion front" *Oncogen*, 2001, 20:1981-1989.

Pawlak, et al., "Zeptosens' protein microarrays: A novel high performance microarray platform for low abundance protein analysis" *Proteomics*, 2002,. 2:383-393.

Perkins, et al., "Fabrication of 15 nm wide trenches in Si by vacuum scanning tunneling microscope lithography of an organosilane self-assembled film and reactive ion etching" *Appl. Phys. Lett.*, 1996, 68(4):550-552.

Pfannschmidt, et al., "Sequence-specific labeling of superhelical DNA by triple helix formation and psoralen crosslinking" *Nucleic Acids Research*, 1996 24(9):1702-1709.

Piner, et al., "Improved imaging of soft materials with modified AFM tips" *Langmuir*, 1999, 15:5457-5460.

Piner, R.D., et al., "Dip-Pen Nanolithography" *Science*, Jan. 29, 1999,283(5402):661-663.

Piner, Richard, "Effect of water on lateral force microscopy in air" *Langmuir*, 1997, 13:6864-6868.

Putnam, C.A.J., "Tapping atomic force microscopy in liquids" *Appl. Phys. Lett.*, 1994, 64(18):2454-2456.

Qin, et al., Fabrication of ordered two-dimensional arrays of micro- and nanoparticles using patterned self-assembled monolayers as templates: *Adv. Matter*, 1999, 11(17):1433-1437.

Rankin, P.C. Wilson, A.T. "The Surface Chemistry of the Mica-Aluminum-Sulfate System" *Journal of Colloid and Interface Science*, (1969) 30(3):277-282.

Reed, et al., "Conductance of molecular junction" *Science*, 1997, 278:252-254.

Rief, et al., "Reversible unfolding of individual Titin Ig-domains by AFM" *Science*, 1997, 276:1109-1111.

Rief, M., et al., "Single Molecule Force Spectroscopy on Polysaccharides by Atomic Force Microscopy" *Science*, 1997, 275:1295-1297.

Rief, M., et al., "The mechanical stability of immunoglobulin and fibronectin III domains in the muscle protein titin measured by atomic force microscopy" *Biophysical Journal*, 1998, 3008-3014.

Robinson, et al., Autoantigen microarrays for multiplex characterization of autoantibody responses *Nature Medicine*, Mar. 2002, 8(3):1-7.

Santos, et al., "Probing hydrophobic interactions of surfaces and macromolecules with atomic force microscope" *Book of Abstracts*, 214 ACS National meeting, Sep. 7-11, 1997, PHYS-248.

Sastry, et al., "Formation of patterned hetrocollidal nanoparticle thin films" *Langmuir*, 2000, 16:3553-3556.

Schaus, S., et al., "Cell Viability and Probe-Cell Membrane Interactions of XR1 Glial Cells Imaged by Atomic Force Microscopy" *Biophysical Journal*, Sep. 1997, 73:1205-1214.

Schena, et al., "Parallel human genome analysis: Microarray-based expression monitoring of 1000 genes" *PNAS USA*, 1996, 93:10614-10619.

Schena, M., *Microarray Biochip Technology*, Eaton Publishing, NatickMA 2000. (Book Reference Not Being Provided).

Schoer, et al., "Scanning probe lithography. 4, Characterization of scanning tunneling microscope-induced patterns in n-Alknethiol self-assembled monolayers" *Langmuir*, 1997, 13:2323-2332.

Schumacher, et al., "Nanomachining of mesoscopic electronic devices using an atomic force microscope" *Applied Physics*, 1999, 75(8):1107-1109.

Schwartz, et al. "Meniscus Force Nanografting: Nanoscopic Patterning of DNA" *Langmuir*, 2001, 17:5971-5977.

Schwartz, et al., "Molecular Transport from an Atomic Force Microscope Tip: A Comparative Study of Dip-Pen Nanolithography" *Langmuir*, American Chemical Society, Nov. 6, 2001.

Schweitzer, et al., "Multiplexed protein profiling on microarrays by rolling-circle amplification" *Nature Biotechnology*, Apr. 2002, 20:359-365.

Shaiu, W.L., et al., "Atomic Force Microscopy of Oriented Linear DNA Molecules Labeled with 5nm Gold Spheres" *Nuc. Acids Res.*, 1993, 21(1):99-103.

Shaiu, W.L., et al., "Visualization of circular DNA molecules labeled with colloidal gold spheres using atomic force microscopy" *J. Vac. Sci. Technol. A.*, 11(4):820-823, no date provided.

Sheehan, et al., "Thiol diffusion and the role of humidity in "dip pen" nanolithography" *Physical Review Letters*, Apr. 15, 2002, 88(15):156104-1-156104-4.

Sheen, et al., "A new class of organized self-assembled monolayers: alkane thiols on GaAs (100)" *J. Am. Chem. Soc.*, 1992, 114:1514-1515.

Shlyakhtenko, L.S., et al., "Structure and dynamics of supercoil-stabilized DNA cruciforms" *J. Mol. Biol.*, 1998, 280(1):61-72.

Shlyakhtenko, L.S., Gall, A.A., et al., "Atomic force microscopy imaging of DNA covalently immobilized on a functionalized mica substrate" *Biophysical Journal*, Jul. 1999, 77:568-576.

Silzel, et al., "Mass-sensing, multianalyte microarray immunoassay with imaging detection" *Clinical Chemistry*, 1998, 44(9):2036-2043.

Smalley, et al., "Nanotube Device" *Science*, Oct. 3, 1997, 278:100-103.

Smith et al., "Overstretching B-DNA: the elastic response of individual double-stranded and single stranded DNA molecules" *Science*, Feb. 9, 1996, 271:795-799.

Snow, et al., "High speed patterning of a metal silicide using scanned probe lithography" *Applied Physics Letters*, 1999, 75(10):1476-1478.

Soh, H., et al., "Integrated nanotube circuits: controlled growth and ohmic contacts to single-walled-carbon nanotubes" *Appl. Phys. Letts.*, 1999, 75(5):627-629.

Sondag-Huethorst, et al., "Generation of electrochemically deposited metal pattern by means of electron beam (nano) lithography of self-assembled monolayer resists" *Appl. Phys. Lett.* 1994, 64(3):285-287.

Southern, E.M., "Detection of specific sequences among DNA fragments separated by gel electrophoresis" *J. Mol. Biol.* 1975, 98:503-517.

Spectroscopy Europe—News Feb./Mar. 2002, 6 pages, http://www.spectroscopyeurope.com/news14_1.html.

Spence, J., Weierstall, U., et al., "Atomic species identification in scanning tunneling microscopy by time of flight spectroscopy" *J. Vac. Sci. Tech.*, 1996, B14(3):1587-1590.

Sreekumar, et al., "Profiling of cancer cells using protein microarrays: Discovery of novel radiation-regulated proteins" *Cancer Research*, 2001, 61:7585-7593.

Steiner, et al., "Adsorption of alkanenitriles and alkanedinitriles on gold and copper" *Langmuir*, 1992, 8: 2271-2777.

Stöckle, R., Setz, P. "Nanoscale Atmospheric Pressure Laser Ablation-Mass Spectrometry" *Anal. Chem.*, 2001, 73(7): 1399-1402.

Su, et al., "Moving beyond Molecules: Patterning Solid-State Features via Dip-Pen Nanolithography with Sol-Based Inks" *JACS*, 2002, 124(8):1560-1561.

Sun, et al., "Nanoscale Molecular Patterns Fabricated by Using Scanning Near-Field Optical Lithography" *JACS*, 2002, 124(11):2414-2415.

Tang, K., Fu, D., et al., "Matrix-assisted laser desporption/ionization mass spectrometry of immobilized duplex DNA probes" *Nucleic Acids Research*, 1995, 23(16):3126-3131.

Tans, et al., "Room-temperature transistor based on a single carbon nanotube" *Nature*, May 7, 1998, 393:49-52.

Tarlov, M.J., Newman, J.G., et al., "Static secondary ion mass spectrometry of self-assembled alkanethiol monolayers on gold" *Langmuir*, 1992, 8:1398-1405.

Tien, et al., "Microfabrication through electrostatic self-assembly" *Langmuir*, 1997, 13:5349-5355.

Troughton, E., Bain, C., et al., "Monolayer films prepared by the spontaneous self-assembly of symmetrical and unsymmetrical dialkyl sulfides from solution onto gold substrates: Structure, properties and reactivity of constituent functional groups" *Langmuir*, 1988, 4:365-385.

Tsukamoto, et al. "Twin-probe scanning tunneling microscope" *Rev. Sci. Instrum.*, Jul. 1991, 62(7):767-1771.

Uetz, P., et al., "A comprehensive analysis of protein-protein interactions in *Saccharomyces cerevisiae*" *Nature*, Feb. 10, 2000, 403(6770):623-627.

Ulman, Abraham, "Formation and structure of self-assembled monolayers" *Chem. Rev.*, 1996, 96:1533-1554.

Vesenka, J. et al., "A substrate preparation for reliable imaging of DNA molecules with the scanning force microscope" *Ultramicroscopy*, 1992, 42-44:1243-1249.

Vesenka, J., et al., "Colloidal gold particles as an incompressable atomic force microscope imaging standard for assessing the compressability of biomolecules" *Biophys. J.*, 1993, 65:992-997.

Vesenka, J., et al., "Combining optical and atomic force microscopy for life sciences research" *BioTechniques*, 1995, 19(2):240-253.

Vettiger, et al., "Ultrahigh density, high-data-rate NEMS-based AFM data storage system" *Microelectronic Engineering*, 1999, 46:11-17.

Vezenov, Dmitri, "Force titrations and ionization state sensitive imaging of functional groups in aqueous solutions by chemical force microscopy" *J. Am. Chem. Soc.*, 1997, 119: 2006-2015.

Vossmeyer, et al., "Combinatorial approaches toward patterning nanocrystals" *Journal of Applied Pysics*, 1998, 84 (7):3664.

Wadu-Mesthrige, et al., "Fabrication and imaging of nanomneter-sized protein patterns" *Langmuir*, 1999, 15: 8580-8583.

Wallraff, et al., "Lithographic imaging techniques for the formation of nanoscopic features" *Chem. Rev.*, 1999, 99: 1801-1821.

Walters, D.A., Hampton, A.D., et al. "Atomic force microscope integrated with a scanning electron microscope for tip fabrication" *Applied Physics Letters*, Aug. 8, 1994, 65(6):787-789.

Wang, et al., "Nanometer scale patterning and pattern transfer on amorphous Si, crystalline Si, and $SiO_2$ surfaces using self-assembled monolayers" *Appl. Phys. Lett.*, 1997, 70(12):1593-1595.

Weierstall, U. Spense, J. "Atom species identification in STM using an Imaging Atom-Probe technique" *Surface Science* 1998, 398: 267-279.

Whitesides, et al., "Self-assembled monolayers and lithography" *Nanophase Chemistry* 1995, 39: 109-122.

Wilbur, et al., "Scanning force microscopes can image patterned self-assembled monolayers" *Langmuir*, 1995, 11: 825-831.

Williamson, et al., "G-quartets in biology: Reprise" *PNAS USA*, Apr. 15, 1993, 90(8):3124-3124.

Williamson, et al., "Monovalent cation-induced structure of telomeric DNA: The G-quartet model" *Cell*, 1989, 59(5): 871-880.

Wilson, et al., "Surface organization and nanopatterning of collagen by dip-pen nanolithography" *PNAS*, Nov. 20 2001, 98(24):13660-13664.

Wong, S., et al., "Covalently functionalized nanotubed as nanometre-sized probes in chemistry and biolog" *Nature*, 1998, 394:52-55.

Wong, S., et al., "Covalently functionalized single-walled carbon nanotube probe tips for chemical force microscopy" *Journal of the American Chemical Society*, 1998, 120:8557-8558.

Wong, S., et al., "Functionalization of carbon nanotube AFM probes using tip-activated gases" *Chem Physics Letters*, 1999, 306:219-225.

Xia, et al., "A selective etching solution for use with patterned self-assembled monolayers of alkanethiolates on gold" *Chem. Mater.*, 1995, 7:2332-2337.

Xia, et al., "Complex optical surfaces formed by replica molding against elastomeric masters" *Science*, 1996, 273: 347-349.

Xia, et al., "Pattern transfer: self-assembled monolayers as ultrathin resists" *Microelectronic Engineering*, 1996, 32: 255-268.

Xia, et al., "Soft lithography" *Agnew Chem. Int. Ed.*, 1998, 37:551-575.

Xia, et al., "Unconventional methods for fabricating and patterning nanostructures" *Chem. Rev.*, 1999, 99:1823-1848.

Xu, et al., "Fabrication of nanometer scale patterns within self-assembled monolayers by nanografting" *Langmuir*, 1999, 15:7244-7251.

Xu, et al., Nanometer-scale fabrication by simultaneous nanoshaving and molecular self-assembly: *Langmuir*, 1997, 13:127-129.

Xu, et al., "Wetting and capillary phenomena of water on mica" *J. Phys. Chem. B.*, 1998, 102:540-548.

Yan Li, et al.,"Electrochemical AFM "Dip-Pen" Nanolithography" *J. Am. Chem., Soc.* 2001, 123:2105-2106.

Yan, et al. "Patterning a performed, reactive SAM using microcontact printing" *J. Am. Chem. Soc.*, 1998, 120:6179-6180.

Yan, et al., "Patterning thin films of poly(ethylene imine) on a reactive SAM using microcontact printing" *Langmuir*, 1999, 15:1208-1214.

Ying, et al., "Programmable Delivery of DNA through a Nanopipet" *Anal. Chem.*, 2002, 74:1380-1385.

Youil, R., Screening for mutations by enzyme mismatch cleavage with T4 endonuclease VII *PNAS USA*, 1995, 92(1):87-91.

Zhong, Q., et al., "Fractured polymer/silica fiber surface studied by tapping mode atomic force microscopy" *Surf. Sci. Lett.*, Jan. 3, 1993, 290: L 688-L692.

Zhu, et al., "Analysis of yeast protein kinases using protein chips" *Nature Genetics*, 2000, 26:283-289.

Zhu, et al., "Global Analysis of Protein Activities Using Proteome Chips" *Science*, Sep. 2001, 293(14):2101-2105.

Hong, S. et al. "A Nanoplotter with Both Parallel and Serial Writing Capabilities", *Science* vol. 288, No. 5472, Jun. 9, 2000, 523-525.

Hong, Z. et al. "Multiple Ink Nanolithography, Toward a Multiple-Pen Nano-Plotter", *Science* vol. 286, No. 5439, Oct. 15, 1999, 1808-1811.

Piner, R.D., et al. "Dip-Pen Nanolithography", *Science* vol. 283, No. 5402, Jan. 29, 1999, 661-663.

* cited by examiner

NANOSCALE MOLECULAR ARRAYER

PRIORITY

This application claims benefit from prior Provisional Application Ser. No. 60/225,434, filed Aug. 15, 2000.

FIELD

This invention relates to the generation of solid state molecular arrays. More specifically, this invention relates to a dedicated apparatus for the creation of molecular arrays in a high throughput format with domain sizes as small or smaller than 1 micron in size.

BACKGROUND

Measuring the binding affinity between materials, molecules, and cells is key to a broad spectrum of industries, including material development, semiconductor production, bioanalytical assays, biomedical diagnostics, and drug discovery. With the emergence of solid state array-based bioanalytical and genetic diagnostic instruments and related equipment, new methods for cost effective screening of a large number of reactions in a miniaturized solid state form have become increasingly desirable. The favored approach to date is to monitor changes in optical properties, usually fluorescence, when a known, fluorescently labeled molecule interacts with a known molecular species at a specific address in a molecular array. These apparatuses and methods, however, often impose stereochemical constraints by the addition of reporter systems to the molecules used to interrogate the molecular array. Thus, label free, direct interrogation of molecular binding events using a micromechanical reporter is of obvious utility. More sophisticated and robust instrumentation for the creation of these molecular arrays is therefore desirable.

One method for the direct detection of molecular interaction events is the scanning probe microscope. One type of scanning probe microscope is the atomic force microscope ("AFM"). In the AFM, a sharp tip is situated at the end of a flexible cantilever and scanned over a sample surface. While scanning, the cantilever is deflected by the net sum of the attractive and repulsive forces between the tip and sample. If the spring constant of the cantilever is known, the net interaction force can be accurately determined from the deflection of the cantilever. The deflection of the cantilever is usually measured by the reflection of a focused laser beam from the back of the cantilever onto a split photodiode, constituting an "optical lever" or "beam deflection" mechanism. Other methods for the detection of cantilever deflection include interferometry and piezoelectric strain gauges.

The first AFMs recorded only the vertical displacements of the cantilever. More recent methods involve resonating the tip and allowing only transient contact, or in some cases no contact at all, between it and the sample. Plots of tip displacement or resonance changes as it traverses a sample surface are used to generate topographic images. Such images have revealed the three dimensional structure of a wide variety of sample types including material, chemical, and biological specimens. Some examples of the latter include DNA, proteins, chromatin, chromosomes, ion channels, and even living cells.

In addition to its imaging capabilities, the AFM can make extremely fine force measurements. The AFM can directly sense and measure forces in the microNewton ($10^{-6}$) to picoNewton ($10^{-12}$) range. Thus, the AFM can measure forces between molecular pairs, and even within single molecules. Moreover, the AFM can measure a wide variety of other forces and phenomena, such as magnetic fields, thermal gradients and viscoelasticity. This ability can be exploited to map force fields on a sample surface, and reveal with high resolution the location and magnitude of these fields, as in, for example, localizing complexes of interest located on a specific surface. To make molecular force measurements, the AFM probe may be functionalized with a molecule of interest.

Construction of molecular arrays on a solid support for use in an AFM is typically carried out by processes that can be divided into two general classes: in situ and ex situ, the latter including a mechanical deposition step to actually place the sample on the deposition surface. In situ synthesis methods and apparatuses may involve photochemical synthesis of nucleic acid or short peptides to define the spatial addresses on a silicon or a glass surface. These methods maybe limited by the wavelength of light used for masking and the synthetic procedure. Furthermore, this procedure may also be limited by cost. A need therefore exists for a dedicated apparatus for the creation of molecular arrays that may create the array in a quick and efficient manner.

An example of an ex situ method followed by the mechanical deposition on the surface may be illustrated by the "dip pen" method. The sample material is prepared in advance and then the dip pen is used to place the sample on the deposition surface. It has been shown that a dip-pen method may be used to draw a submicron molecular line or spot using an alkanethiolate monolayer utilizing a standard AFM to control the dip pen. Other prior art instruments may utilize a pin tool which is dipped in a solution containing the sample material. The pin tool then has a drop of solution on it, which is then placed on the deposition surface. This method, however, does not allow the creation of extremely small deposition domains. Up until this time, AFMs have been utilized for drawing sub-micron molecular lines or creating the molecular spots. AFMs, however, are not optimal for creating arrays because they lack features, such as a sub-micron precision sample stage under computer control, precise optical access for sample registration, and unencumbered access to the software code used to control the tip motion. Furthermore, commercial AFM configurations are not amenable to the rapid deposition of large numbers of different molecular species. Finally, AFMs are designed for multiple tasks, not as a dedicated sample deposition instrument, and are therefore more expensive than is required for a dedicated arrayer. Still other features may also be desirable in a dedicated deposition instrument and not included with an AFM. A need therefore exists for an instrument that is dedicated to the creation of arrays comprised of deposition domains.

A need exists for a commercially practical deposition instrument that can be utilized to create a molecular deposition array that includes sub-micron deposition domains. This instrument may incorporate precise optical features for sample registration and may be controlled utilizing a computer control so that user defined array patterns and sizes may be created. It may be particularly advantageous if this instrument can operate autonomously in a high throughput format.

SUMMARY

An apparatus for creating molecular arrays comprising a base, a Z controller operably connected to the base wherein the Z controller is selectively positionable along a Z axis, a deposition probe removably and operably connected to the Z controller so that the deposition probe is selectively positionable along the Z axis by the Z controller, an X, Y controller operably connected to the base wherein the X, Y controller is selectively positionable along an X axis and a Y axis, the X, Y controller further comprising a deposition substrate operably attached thereto and wherein the movement of the X, Y controller moves the deposition substrate between a first position and a second position, the second position being operably positioned relative to the deposition probe, and an X, Y translation stage operably connected to the base wherein the X, Y translation stage is selectively positionable along an X axis and a Y axis, the X, Y translation stage further comprising a loading substrate operably attached thereto and wherein the movement of the X, Y translation stage moves the loading substrate between a first position and a second position, the second position being operably located relative to the deposition probe and the first position being in a position accessible by the user.

A method for creating a deposition domain comprising (a) obtaining a loading substrate, the loading substrate further including a deposition material, (b) loading the deposition material onto a deposition probe, and (c) creating a deposition domain on a deposition substrate by transferring a desired amount of the deposition material from the deposition probe to the deposition substrate.

An apparatus for creating an array comprising, a Z controller, a deposition probe operably attached to the Z controller, the deposition probe further comprising a tip, an X, Y controller operably attached to the Z controller, the X, Y controller selectively movable between a first position and a second position, and a deposition substrate operably affixed to the X, Y controller wherein when the X, Y controller moves the deposition substrate to the second position the deposition substrate is operably positioned relative to the deposition probe.

The present invention is a dedicated instrument for the creation of molecular arrays comprising deposition domains as small or smaller than 1 micron. Utilizing the present invention arrayer may limit the use of expensive reagents and test materials and may further help to conserve space in large scale combinatorial chemistry labs. Finally, the present invention may permit the testing of a large number of samples in a high throughput format because of the ease of making custom designed arrays with a variety of deposition materials placed thereon.

The present invention apparatus utilizes a deposition technique in which the sample is transiently hydrated to form a capillary bridge. The capillary bridge may transport the deposition material from the loading substrate, to the deposition probe, and from the deposition probe to the deposition substrate, to create a deposition domain. One or more deposition domains make up the array. The capillary bridge deposition technique utilized by the present invention apparatus is further described herein, and is also described in detail in co-pending U.S. application Ser. No. 09/574,519, which is herein incorporated by reference for all that it teaches.

DETAILED DESCRIPTION

The specification describes an arrayer 10 that creates arrays comprised of deposition domains in a high throughput format. In one embodiment the arrayer is automatically controlled, bypassing the need for a user to constantly monitor the formation of the array. A general description of the components of the arrayer 10 will be undertaken followed by a more specific description of each component.

Figure 1:
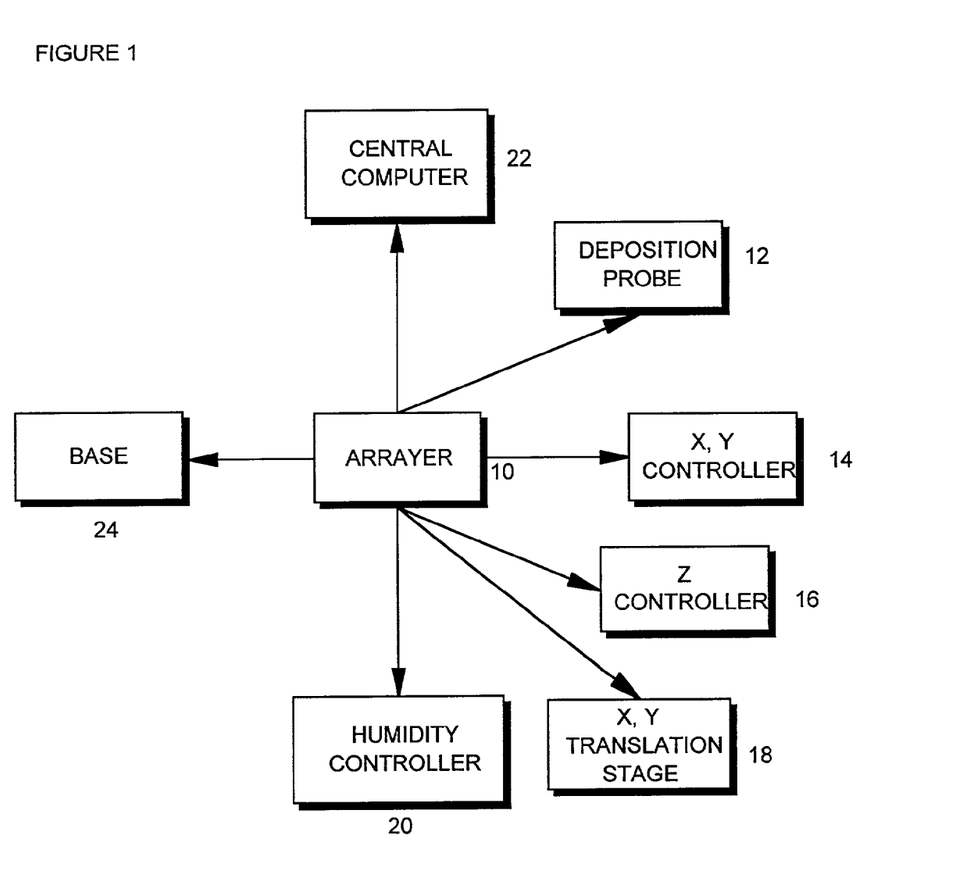
FIG. 1 is a block figure representing the various components of the one embodiment of the present invention.
Figure 2:
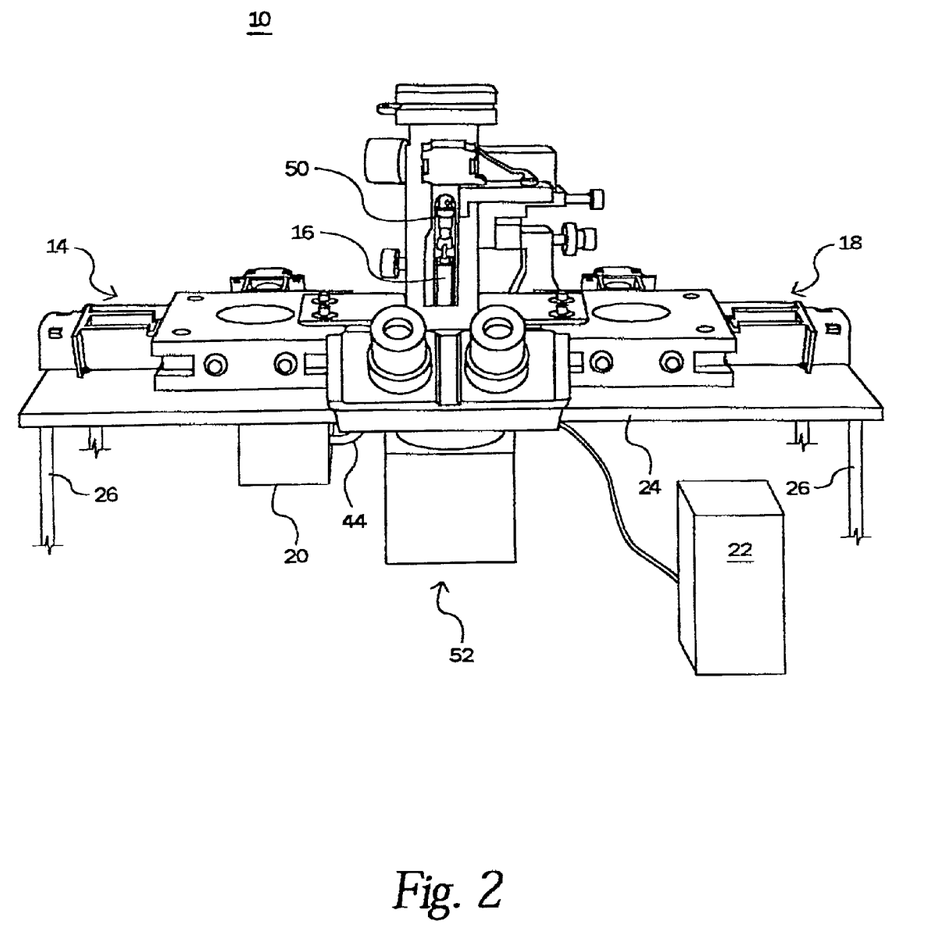
FIG. 2 is a front view of the instrument of one embodiment of the present invention.

As illustrated in FIGS. 1 and 2, one embodiment of the present invention arrayer 10 may be comprised of a deposition probe 12, an X, Y, controller 14, a Z controller 16, an X, Y translation stage 18, a humidity controller 20, a control computer 22, and a base 24. The deposition probe 12 may be operably connected to the Z controller 16 which in turn may be affixed to the base 24. The X, Y controller 14 may also be affixed to the base 24 on a first side, of the Z controller 16. The X, Y translation stage 18 may further be affixed to the base 24 on a second side of the Z controller 16. The humidity controller 20 and the control computer 22 may be operably positioned relative to the deposition probe 12, the X, Y controller 14, and the X, Y translation stage 18 so that the humidity controller 20 may properly perform its respective function, i.e., controlling the humidity. The computer 22 controls the function of the various components of the present invention arrayer 10. As may be appreciated, a number of formations and designs imagined by those skilled in the art may be utilized to attach the X, Y controller 14, the Z controller 16, the X, Y translation stage 18, etc. to the base 24. Different orientations of the components does not alter the scope of the present invention. Furthermore, these components may be attached in a number of different ways, including bolting, welding, snapping, etc.

Figure 3A:
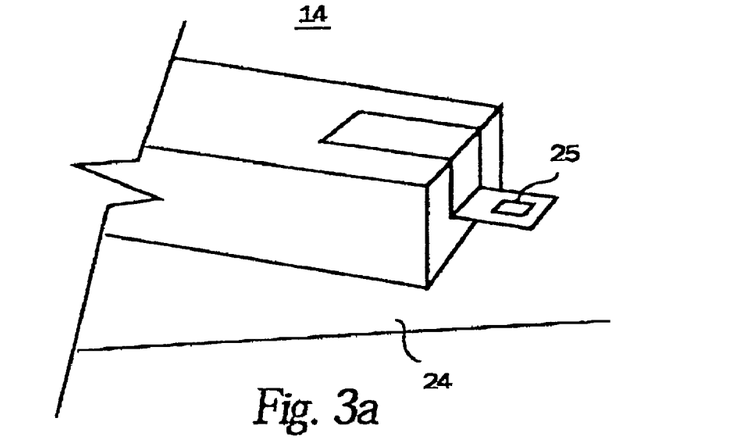
FIG. 3a is a perspective view of the X, Y controller of one embodiment of the present invention.

As illustrated in FIG. 3a, the X, Y controller 14 further includes a deposition substrate 25 movably and removably affixed thereto. The deposition substrate 25 is the surface upon which the present invention deposits the material. The deposition substrate 25 is moved by the X, Y controller 14 into a position underneath the Z controller 16 so that the deposition probe 12 can be lowered and the deposition material deposited. The deposition substrate 25 may be affixed to the X, Y controller 14 utilizing snaps, clips, raised contours, or by other methods known to those skilled in the art. The details of how the arrayer 10 deposits the material is better understood after an explanation of each of the portions of the present embodiment. In still further embodiments, one controller may control the movement of the deposition probe 12 in the X, Y, and Z directions.

The deposition substrate 25 utilized in the present invention apparatus may be formed of a variety of materials depending on the nature of the deposited material. A further description of such deposition substrates 25 can be found in U.S. application Ser. No. 09/574,519, but may be altered or changed without changing the nature or scope of the present invention arraying apparatus.

Figure 3B:
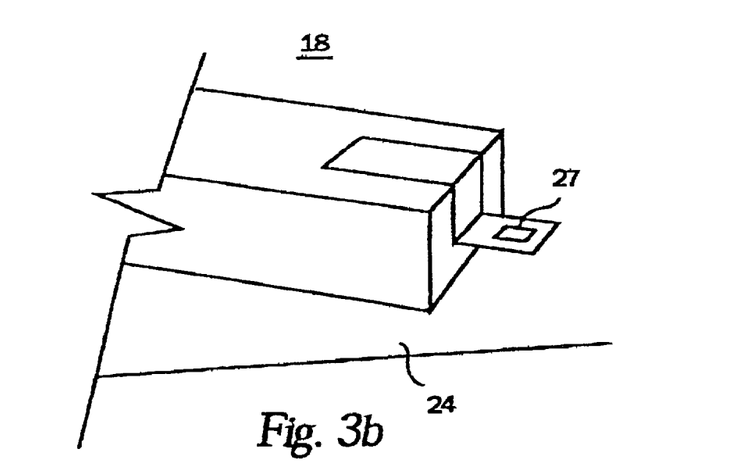
FIG. 3b is a perspective view of the X, Y translation stage of one embodiment of the present invention.

As is further illustrated in FIG. 3b, the X, Y translation stage 18 may further include a loading substrate 27. The loading substrate 27 may be the surface on which the deposition material resides before it is loaded onto the deposition probe 12, and then onto the deposition substrate 25, of the arrayer 10. The deposition material may be placed on the loading substrate 27 by methods known to those reasonably skilled in the art, such as by mechanical deposition, in situ photochemical synthesis, "ink jet" printing, and electronically driven deposition, without changing the nature and scope of the present invention.

In one embodiment, as illustrated in FIG. 2, the arrayer 10 may further comprise a force feedback monitor 50 and an optical microscope 52. The force feedback monitor 50 may be operably connected to the deposition probe 12, the Z controller 16, and the control computer 22. The force feedback monitor 50 may assist the present invention in controlling the height of the deposition probe 12 relative to the deposition substrate 25 and the loading substrate 27. The optical microscope 52 may be operably attached at a position below the base 24 in such a position to aid the user in observing the action of the arrayer 10.

Each of these separate components of the present invention apparatus will now be further described herein.

Base 24

With reference to FIG. 2, the base 24 of the present invention will be herein described. The base 24 of the present embodiment is physically stable and provides various places where the separate portions of the present invention may be mounted. The base 24 of the present embodiment may utilize a 12×24 inch optical plate supported on steel posts 26. The optical plate is a standard platform for building various types of instrumentation.

One commercially available optical plate 24 that may be well suited for use in the present invention arrayer 10 may be available from Newport Corp., P.O. Box 19607, Irvine Calif. 92623-9607 as product number SA12. The plate may have ¼ inch holes drilled on one inch centers. Steel posts 26 well suited for the present invention may also be commercially available from the same manufacturer as product number SP12.

In alternative embodiments, the optical plate may be placed on top of an optical table. The optical table can be floated on nitrogen pistons to optimize the elimination of vibrations, though in the present embodiment it is not necessary to go to such extremes to create arrays with the present invention.

Controller 14

With reference to FIGS. 2 and 3a, the X, Y controller 14 of the present invention will be herein described. As illustrated in FIGS. 2 and 3a, the X, Y controller 14 may be operably attached to the base 24. The X, Y controller 14 should be capable of microfine and repeatable movement so that the attached deposition substrate 25 can be precisely positioned in a repeatable manner underneath the deposition probe 12. The operative end of the X, Y controller 14, as illustrated in FIG. 2, may be positioned in such a manner that the X, Y controller 14 will move the deposition substrate 25 underneath the deposition probe 12 with micron precision and will also be able to move the deposition substrate 25 out of the way to allow the X, Y translation stage 18 to move the loading substrate 27 under the deposition probe 12.

One X, Y controller 14 may be a piezo driven inchworm precision mechanical stage. The inchworm mechanism may have a significant range of motion while maintaining the microfine precision desirable for the present invention. Such a stage may have approximately 20 nm spatial resolution in the X and Y planes and may further utilize encoders to ensure repeatability. The stage may be fitted with a plate designed by those skilled in the art to hold the sample deposition substrate 25. One inch worm stage that may be useful is commercially available from Burleigh Instruments, Burleigh Park, P.O. Box E, Fishers, N.Y. 14453-0755.

In an alternative embodiment, a piezo driven flexure stage may also be utilized as the X, Y controller 14. A piezo driven flexure may have essentially the same precision as the inchworm stage. In still a further embodiment, a linear piezo ratchet mechanism, such as is available from NanoMotion, Israel, may be utilized. FIG. 2 illustrates an X, Y controller 14 with a separate motor for the X and Y direction, although various designs may be utilized.

X, Y Translation Stage 18

With reference to FIGS. 2 and 3b, the translation stage 18 may be further herein described. The X,Y translation stage 18 is operably attached to the base 24 in a position relative to the Z controller 16 and the deposition probe 12 such that it operably interacts with the same. In the present embodiment, the operative end of the X, Y translation stage 18 is fitted with a loading substrate 27 pre-constructed with one or more deposition materials placed thereon. The loading substrate 27 may be operably affixed to the X, Y translation stage 18 in much the same manner as the deposition substrate 25 is attached to the X, Y controller 14. As illustrated in FIGS. 2 and 3b, the X, Y translation stage may be positioned such that the loading substrate 27 can be moved into an operable position underneath the deposition probe 12.

In one embodiment, the X, Y translation stage 18 may utilize the same type of X, Y positionable inchworm or piezo device as the X, Y controller 14. In alternative embodiments the X, Y translation stage 18 may not require such microfine control since the deposition material may be placed in a much larger, and therefore easily accessible, domain on the loading substrate 27 compound with the domain created on the deposition substrate 25. As illustrated in FIG. 2, the present embodiment X, Y translation stage 18 may have much the same design as the X, Y controller 14.

In further embodiments, the X, Y translation stage 18 may have such a range of motion that the loading substrate 27 can be loaded in a first position and then transported into a second position underneath the deposition probe 12. In this manner, the loading substrate 27 may be cleaned and reloaded with a second deposition material after the first deposition material is loaded onto the probe, all in an automatic fashion.

Z Controller 16

With reference to FIG. 2, the Z controller 16 of the present invention will be herein further described. The Z controller 16 may be operably attached to the base 24 where it can operably interact with the X, Y controller 14 and the X, Y translation stage 18. The Z controller 16 may freely move in the vertical (Z) direction. The Z controller 16 of the present invention preferably has an accuracy of 200 nm or less in the Z direction so that the arrayer 10 may be able to accomplish repeatable and consistent deposition domains in a high throughput format. It may also be preferable for the Z controller 16 to have lateral repeatability of one micron or less so that the present invention can create high density arrays with as little as 1 to 2 microns, or less, of space between each spot on the array, i.e., the pitch.

In one embodiment, the Z controller 16 may be commercially available from Newport Corporation, P.O. Box 19607, Irvine, Calif. 929623-9607, product number TSV 150. In this present embodiment, the Z controller 16 stays relatively stationary in the X, Y direction, allowing the X, Y controller 14 and the X, Y translation stage 18 to move the substrates 25, 27 into position. In alternative embodiments, the Z controller 16 may have X, Y mobility without changing the nature and scope of the present invention.

Deposition Probe 12

Figure 4:
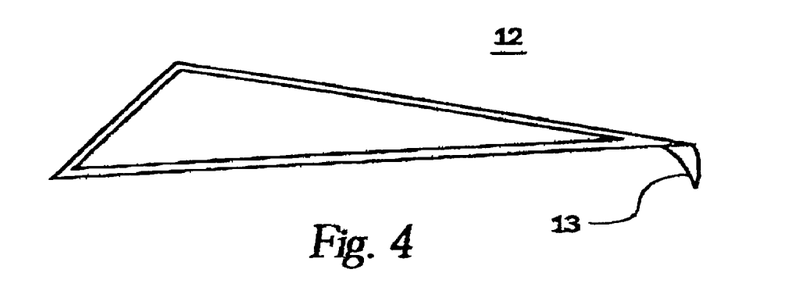
FIG. 4 is a perspective view of the deposition probe of one embodiment of the present invention.

As illustrated in FIGS. 2 (fixed to the end of the Z controller 16, but not visible in FIG. 2) and 4 the present invention deposition probe 12 may be further described herein. The deposition probe 12 is preferably 100 to 200 microns long and has a tip 13 of roughly 1–20 microns in height. The radius of curvature of the tip 13 may be approximately 10–50 nm. In one embodiment the probe is modified with a 5–10 micron diameter sphere mounted on the end of the cantilever. The manner in which the sphere can facilitate loading of the probe 12 and deposition of the deposition material may be further described in the above referenced patent application. Furthermore, the operative attachment of such a probe 12 to a Z controller 16 is well known to share in the art and need not be described here.

A commercially available probe may be utilized as the deposition probe 12 of the present invention. Such a probe may be a standard silicon nitride AFM probe available from Digital Instruments/Veeco, 112 Robin Hill Road, Santa Barbara, Calif.

Humidity Controller 20

Figure 5:
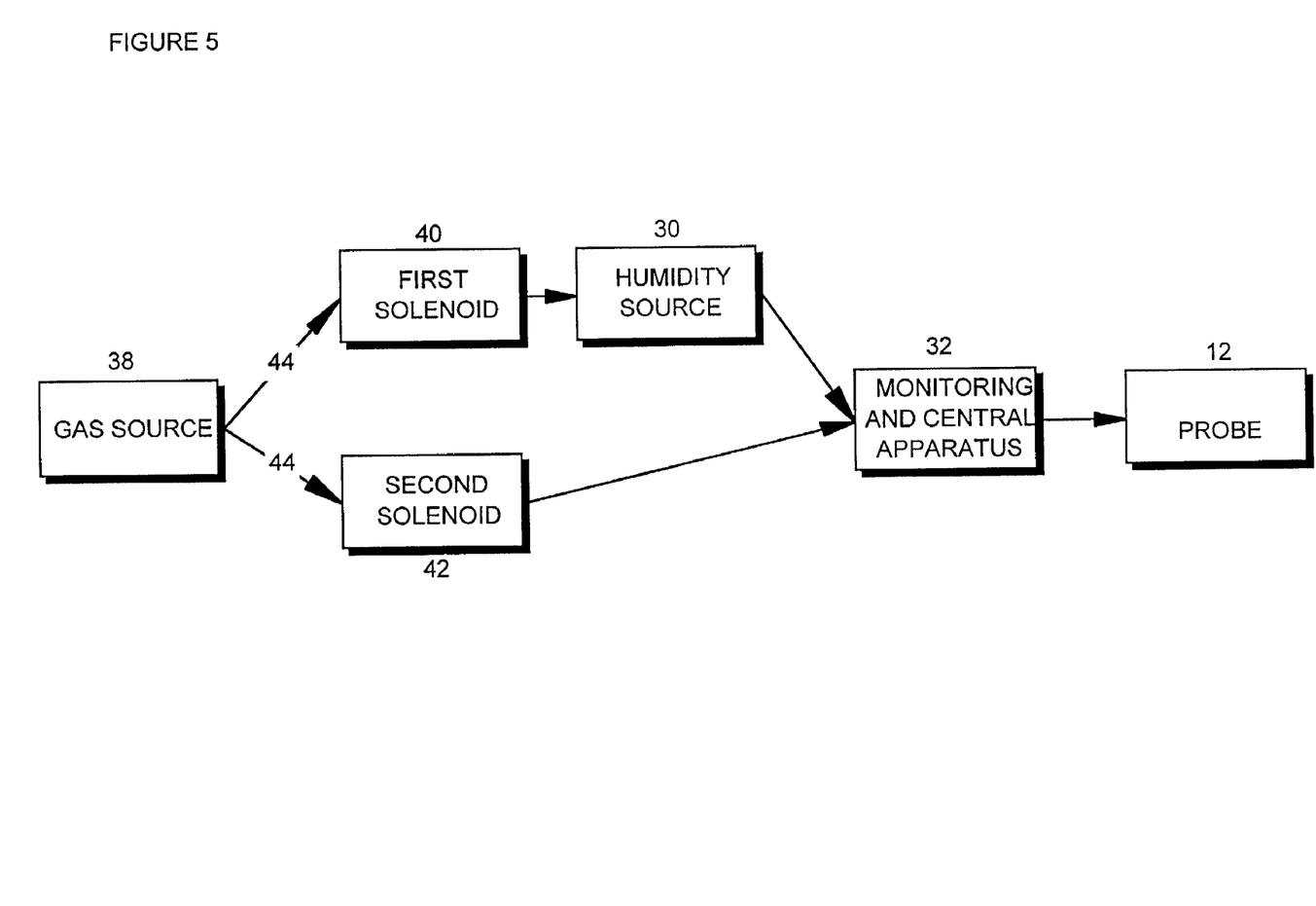
FIG. 5 is a block diagram showing the components of the humidity controller of the present invention.

As illustrated in FIGS. 2 and 5, the humidity controller 20 of the present invention will be herein described. As illustrated in FIG. 2, the controller 20 may be operably affixed to the base 24. As illustrated in FIG. 5, the humidity controller 20 may further comprise a humidity source 30, a gas flow monitoring and control apparatus 32 (not shown) a gas source 38, a first solenoid valve 40, a second solenoid valve 42, and interconnective tubing 44. The humidity source 30 may be operably positioned to effectively and accurately control the humidity around the deposition probe 12 during the loading and deposition of the deposition material. The monitoring system 32 may be positioned between the humidity source 30 and the deposition probe 12 and controlled by the computer 22. The gas source 38 may be operably connected to the first solenoid 40 and the humidity source 30 by the tubing 44. The gas source may be further connected to the second solenoid 42 by tubing 44 bypassing the humidity source. Furthermore, as shown in FIG. 2, tubing 44 may channel the gas to the probe 12. The humidity controller 20 of the present invention may allow for the reproducible deposition of samples in sub-micron and nanometer domains.

The humidity source 30 of the present embodiment utilizes a wetted piece of filter paper or a sponge in a plastic cartridge. A dry inert gas, such as argon, is placed into the cartridge from the gas source 38 and kept under a positive pressure though the use of the solenoid valve 40 controlled by the control system. As illustrated in FIG. 5, the gas is discharged by the humidity controller 20, through the solenoid valve 40 and the humidity source 30, past the monitoring and control approaches 32 to flow over the deposition probe 12 and to increase the relative humidity around the probe 12 in such a manner as to effectuate the loading or deposition of the deposition material.

As illustrated in FIG. 5, the second solenoid 42 may also draw gas from the gas source 38, but route the gas through tubing 44 that goes around the plastic cartridge 36 and then to the monitoring and control apparatus 32. In this manner, dry gas may be delivered to the deposition probe 12. The solenoid 42 is controlled by the computer 22 and the monitoring apparatus 32 in such a manner that dry gas is mixed with humid gas to achieve the desired humidity level before reaching the probe 12. Furthermore, after the deposition material is placed on the deposition probe 12, or the deposition substrate 25, the dry gas solenoid 42 may be used to blast dry gas over the deposition probe to dry the deposition material on the probe 12 or on the deposition substrate 25. As may be appreciated, the output from the solenoids 40, 42 may be routed through the monitoring apparatus 32 attached to the monitoring system 32 so to improve repeatability and optimal deposition conditions for various deposition materials. A numerical value may be assigned to each flow rate; monitoring and variations of this numerical value may aid in achieving the desired humidity levels.

In alternative embodiments, a more sophisticated humidity generator may be utilized so that the present invention can further increase the precision and repeatability of the relative humidity surrounding the sample. In yet another embodiment, the dry air may be continuously blown over the deposition probe 12, briefly stopped during the wet gas blast, and then immediately turned on again to minimize sample diffusion on the surface.

In still another embodiment, a constant, humid environment may be adequate for sample loading and deposition. For this embodiment, the present invention may include a plastic chamber or room that envelopes the deposition probe 12, the operative ends of the X, Y controller 14, and the X, Y translation stage 18, or the entire instrument. The chamber or room may be filled with a gas of the desired humidity for the duration of the loading and deposition program.

Control Computer 22

With reference to FIGS. 1 and 2, the control computer 22 will be herein described. The control computer may be a standard computer utilizing a Pentium, Athlon, or other computer chip with a standard operating environment that includes a monitor, hard drive, etc. The present embodiment may utilize a standard data acquisition computer board commercially available from National Instruments, 11500 Mopac Expressway, Austin, Tex. 78759-3504, product number PCI-6025e. Such an acquisition board may compile the necessary data to control the humidity, the height of the deposition probe 12, the relative positions of the Z controller 16, the X, Y controller 14, the X, Y translation stage 18, and may also monitor the positions that the deposition material is placed on the deposition substrate 25. Standard or customized software may be loaded onto the computer 22 and may control the operation of the data acquisition board. Customizable software of particular use may be available from LabView.

In addition to the computer controller 22, a stepper motor controller card (A-100 from Mill-Shaf Technologies, Inc.) may be utilized to control the fine action of the X, Y controller 14, the Z controller 16, and the X, Y translation stage 18. The stepper motor controller card of the present embodiment may also be controlled by the LabView (National Instruments) software or other software written by those skilled in the art.

Force Feed Back Monitor 50

With reference to FIG. 2, the force feed back monitor 50 may be further described herein. As previously noted, the force feed back monitor 50 may be operably attached to the Z controller 16 and the control computer 22. The force feed back monitor 50 may be able, along with the control computer 22, to accurately recognize when the deposition probe 12 and the loading substrate 27, or the deposition probe 12 and the deposition substrate 25 touch. Knowing the exact moment of contact between and probe 12 and the substrate 25, 27 may more accurately allow transferal of the deposition material from the loading substrate 27 to the deposition probe 12 and from the deposition probe 12 to the deposition substrate 25. A force feed back monitor 50 coupled with the control computer 22 may be known to those in the art for achieving such a result.

In alternative embodiments, the force feed back monitor 50 may only be used to determine the initial relationship of the substrates 25, 27 and the probe 12.

Utilizing the present invention arrayer 10 the probe 12 may be brought into contact with the substrate 25, 27 and then drawn back up to 1 mm or more before being exposed to the humid gas which causes the capillary bridge to form, thus loading or depositing the deposition material. Once the position of the substrate 25, 27 is determined relative to the probe 12, the computer 22 may simply bring the probe 12 to the desired level above the substrate 25, 27 for the subsequent depositions without having to touch the surface of the substrate 25, 27.

Various types of force feed back monitors 50 useful for the above may be known to those skilled in the art.

One commercially available force feed back monitor may be an AFM head from a Dimension 3100 series scanning probe microscope available from Digital Instruments. Other force feed back monitors may be utilized by those of reasonable skill in the art without changing the nature and scope of the present invention. In the present embodiment, the read-out of the monitor 50 may be read through a standard break-out box and fed directly into LabView. In operation, a deflection value may be established as the threshold value at which LabView will stop the Z controller 14. Thus, once the surface is "found," the instrument of the present invention may be programmed to move the Z controller 14 to within 200 nm of the same position repeatedly. In this manner, the instrument may approach and retract from the surface rapidly without the necessity of slowing and carefully counting steps until contact is made on each deposition cycle.

Optical Microscope 52

With reference to FIG. 2, the optical microscope 52 may be further herein described. As illustrated in FIG. 2, the optical microscope 52 is mounted underneath the optical plate in an inverted position. The optical microscope 52 allows the user to visualize the loading and deposition steps from below the deposition probe 12. Such monitoring may be within the resolution limits of the far field optics of a standard microscope that includes 10×, 20×, 40×, and 60× magnification options with a 10× eyepiece. In still further embodiments, such a microscope may be fitted with a camera for image output to the computer 22, to a separate monitor or to a recording device. As may be appreciated by those skilled in the art, the microscope may be excluded from the present invention arrayer 10 without changing the nature and scope of the invention.

Although the deposition domains may be smaller than the wavelength of the light being used, they are separated by distances on the order of 2 microns, allowing them to be separately observed by virtue of their optical characteristics. This is analogous to far field optical observation of sub-wavelength objects such as individual DNA molecules and manometer scale colloidal metals by virtue of light collected from intercalated fluorophores or reflected photons, respectively. This, optical monitoring may be a useful method for preliminary evaluation of the deposition event as performed by the present invention.

Method of Use

The method of use of the present embodiment will now be herein described. The Z controller 16 is used to bring the probe 12 into contact, or near contact, with the loading substrate 27. Contact force is regulated by monitoring the cantilever deflection signal in LabView through the force feed back monitor 50. A blast of humid gas is then utilized to create a capillary bridge between the probe 12 and the loading substrate 27. This capillary bridge transfers some amount of the deposition material to the probe 12. The deposition probe 12 is then withdrawn using the Z controller 16. The loading substrate 27 is then moved by the X, Y translation stage 18 out of position beneath the probe 12. The X, Y controller 14 then moves the deposition substrate 25 into position underneath the probe 12. The probe 12 is then brought down into position by the Z controller 12 and the humidity cycle repeated to deposit the deposition material on the deposition substrate 25.

As may be appreciated, this process may be carried out many times before the deposition probe 12 is significantly depleted of deposition material. Thus, one to several deposition domains for each array can be constructed after loading the probe 12 just one time. Each time a new deposition material is deposited, the deposition probe 12 is cleaned. In one embodiment, the probe 12 may be cleaned with UV or ozone burst before loading a second deposition material.

In one embodiment, a sample of protein at a concentration of about 0.1 mg/ml in PBS (a buffered saline solution) may be deposited as a microdrop on a clean glass surface and dried to serve as the deposition materials/loading substrate. The deposition tool may be allowed to contact the dried microdrop and the humidity controlled to allow adsorption of protein to the deposition probe tip 13. This process typically results in loading of the deposition tool with sufficient material for 10 to 100 deposition events. The loaded deposition probe 12 is then utilized to deposit the PBS onto a freshly prepared gold or gold/alkanethiolate surface.

Each cycle of loading the probe and making one domain on the deposition substrate may take as little as 1 minute. In addition, the actual deposition event is relatively short, so the difference between making one and several spots with a single source material is only a few seconds at most. Thus, to build one, or many 10×10 molecular arrays of 100 different molecular species may take approximately 1 hour and 40 minutes. In alternative embodiments, this process may be further streamlined and scaled up to allow construction of much more complex arrays (hundreds to thousands of molecular species), and larger numbers of arrays in a similar time frame, without changing the nature and scope of the present invention. All of these steps may be coordinated through LabView utilizing the computer 22.

In still further embodiments, there may be several X, Y translation stages 18 to bring loading substrates 27 into an operable position underneath the deposition probe 12. In this manner multiple deposition materials can be accessed on the multiple loading substrates 27, allowing for the creation of an extremely diverse array.

In yet another alternative embodiment, the optical microscope 52 may be utilized to locate registration marks for sample deposition in defined physical locations.

In another embodiment, the probe may be washed using a microfabricated well with a simple fluidic feed. The washing solution (e.g., water) may be fed into the device, forming a protruding bubble held in place by surface tension. The deposition tool may then be washed in the bubble by piezo driven oscillation of the bubble in the probeiz.

As will be appreciated by those skilled in the art, spot size will be a function of the radius of curvature of the deposition tool, tool and surface hydrophobicity/hydrophilicity, and the control of humidity during the deposition event. The present invention may allow spot sizes in the 200 nm diameter range (tool radius is typically 40 nm) reproducibly when the appropriate parameters are carefully monitored. It is noteworthy that spots quite a bit smaller than this may be possible depending on the sample material and the purposes envisioned for the deposition domain.

The information and examples described herein are for illustrative purposes and are not meant to exclude any derivations or alternative methods that are within the conceptual context of the invention. It is contemplated that various deviations can be made to this embodiment without deviating from the scope of the present invention. Accordingly, it is intended that the scope of the present invention be dictated by the appended claims rather than by the foregoing description of this embodiment.

What is claimed is:

1. An apparatus for creating a molecular array comprising:
   a base;
   a Z controller coupled to the base, wherein the Z controller is selectively positionable along a Z axis relative to the base;
   a deposition probe removably coupled to the Z controller so that the deposition probe is selectively positionable along the Z axis relative to the base by the Z controller;
   an X, Y controller coupled to the base, wherein the X, Y controller is selectively positionable in an X-Y plane independently of movement of the Z controller, the X, Y controller further comprising a deposition substrate coupled thereto and wherein the movement of the X, Y controller moves the deposition substrate between a first position and a second position, the second position being located under the deposition probe; and
   an X, Y translation stage coupled to the base wherein the X, Y translation stage is selectively positionable in an X-Y plane independently of movement of the X, Y controller, the X, Y translation stage further comprising a loading substrate coupled thereto and wherein the movement of the X, Y translation stage moves the loading substrate between a first position and a second position, the second position being located under the deposition probe.

2. The apparatus of claim 1 further comprising a control computer.

3. The apparatus of claim 2 further comprising a humidity controller coupled to the base wherein the humidity controller controls the humidity around the deposition probe.

4. The apparatus of claim 3 wherein the humidity controller is coupled to the control computer.

5. The apparatus of claim 1 wherein the Z controller has an approximately 200 nanometer spatial resolution along the Z axis.

6. The apparatus of claim 5 wherein the X, Y controller has an approximately 20 nanometer spatial resolution in the X-Y plane.

7. The apparatus of claim 1 wherein the loading substrate further comprises one or more deposition materials deposited thereon.

8. The apparatus of claim 1 further comprising an optical microscope coupled to the base.

9. The apparatus of claim 2 further comprising a force feedback monitor.

10. The apparatus of claim 1 wherein the deposition probe further includes a tip.

11. The apparatus of claim 10 further comprising a humidity controller, the humidity controller selectively controlling the humidity of the air around the tip.

12. The apparatus of claim 2 wherein the control computer further comprises a stepper motor control card.

13. The apparatus of claim 11 wherein the humidity controller further comprises a dry gas source, a humidity source, and a gas flow monitor.

14. An apparatus for creating a molecular array on a deposition substrate comprising:
    a base;
    a deposition probe removably coupled to the base;
    an X, Y translation stage coupled to the base wherein the X, Y translation stage is selectively positionable along the X axis, and the Y axis, the X, Y translation stage further comprising a loading substrate coupled thereto and wherein the movement of the X, Y translation stage moves the loading substrate between a first position and a second position, the second position being located under the deposition probe; and
    an X, Y controller coupled to the base wherein the X, Y controller is selectively positionable along the X axis, and the Y axis independently of the X, Y translation stage, the X, Y controller further comprising a deposition substrate coupled thereto and wherein the movement of the X, Y controller moves the deposition substrate between a first position and a second position, the second position being located under the deposition probe.

15. The apparatus of claim 14 further comprising a control computer.

16. The apparatus of claim 15 further comprising a humidity controller coupled to the base wherein the humidity controller controls the humidity around the deposition probe.

17. The apparatus of claim 16 wherein the humidity controller is to the control computer.

18. The apparatus of claim 14 further comprising a Z controller coupled to the base, wherein the Z controller is selectively positionable along a Z axis, and wherein the Z controller has an approximately 200 nanometer spatial resolution along the Z axis.

19. The apparatus of claim 18 wherein at least one of the X, Y controller and the X, Y translation stage have an approximately 20 nanometer spatial resolution along the X and Y axes.

20. The apparatus of claim 14 wherein the loading substrate further comprises one or more deposition materials deposited thereon.

21. The apparatus of claim 14 further comprising an optical microscope coupled to the base.

22. The apparatus of claim 15 further comprising a force feedback monitor.

23. The apparatus of claim 14 wherein the deposition probe further includes a tip.

24. The apparatus of claim 23 further comprising a humidity controller, the humidity controller selectively controlling the humidity of the air around the tip.

25. The apparatus of claim 15 wherein the control computer further comprises a stepper motor control card.

26. The apparatus of claim 25 wherein the humidity controller further comprises a dry gas source, a humidity source, and a gas flow monitor.

27. An apparatus for creating an array on a substrate comprising:
    a base;
    a deposition probe coupled to the base, the deposition probe further comprising a tip;
    an X, Y translation stage coupled to the base and movable in X and Y directions;

a loading substrate coupled to the X, Y translation stage where the loading substrate is selectively movable in the X and Y directions and into a position under the deposition probe;

an X, Y controller coupled to the base and movable in the X and Y directions independently with respect to the X, Y translation stage;

a deposition substrate coupled to the X, Y controller where the deposition substrate is selectively movable by the X, Y controller into a position under the deposition probe; and a humidity controller, the humidity controller selectively adjusting the humidity around the deposition probe, the X, Y translation stage, and the X, Y controller.

28. An apparatus for creating an array on a substrate, the apparatus comprising:

a base;

a Z controller coupled to the base and movable relative to the base along a Z axis;

a deposition probe removably coupled to the Z controller such that the deposition probe is movable relative to the base along the Z axis;

a loading substrate coupled to the base and movable relative to the deposition probe in an X-Y plane, the loading substrate movable between a first position in the X-Y plane in which the loading substrate is not positioned under the deposition probe and a second position in which the loading substrate is positioned under the deposition probe to allow the deposition probe to pick up material from the loading substrate; and a deposition substrate coupled to the base and movable relative to the deposition probe in an X-Y plane, the deposition substrate movable independently of movement of the loading substrate between a first position in the X-Y plane in which the deposition substrate is not positioned under the deposition probe and a second position in which the deposition substrate is positioned under the deposition probe to allow the deposition probe to deposit material onto the deposition substrate.

* * * * *